United States Patent
Kim et al.

(10) Patent No.: US 9,538,076 B2
(45) Date of Patent: Jan. 3, 2017

(54) IMAGE PROCESSING DEVICES FOR SUPPRESSING COLOR FRINGE, AND IMAGE SENSOR MODULES AND ELECTRONIC DEVICES INCLUDING THE SAME

(71) Applicant: Samsung Electronics Co., Ltd., Suwon-si, Gyeonggi-do (KR)

(72) Inventors: Jihye Kim, Seongnam-si (KR); Rae-Hong Park, Seoul (KR); Dong-Won Jang, Seoul (KR); Hyo-Song Kim, Chuncheon-si (KR); Chang-Dae Jung, Seoul (KR)

(73) Assignees: Samsung Electronics Co., Ltd., Gyeonggi-do (KR); Sogang University Research Foundation, Seoul (KR)

( * ) Notice: Subject to any disclaimer, the term of this patent is extended or adjusted under 35 U.S.C. 154(b) by 0 days.

(21) Appl. No.: 14/741,599

(22) Filed: Jun. 17, 2015

(65) Prior Publication Data

US 2016/0171663 A1    Jun. 16, 2016

(30) Foreign Application Priority Data

Dec. 16, 2014 (KR) .................. 10-2014-0181815

(51) Int. Cl.
*G06T 7/00* (2006.01)
*H04N 5/232* (2006.01)
(Continued)

(52) U.S. Cl.
CPC ........... *H04N 5/23229* (2013.01); *G06T 5/006* (2013.01); *G06T 2207/10024* (2013.01)

(58) Field of Classification Search
CPC ................ G06T 5/002; G06T 7/408; G06T 2207/10024; H04N 5/23229; H04N 9/7917
(Continued)

(56) References Cited

U.S. PATENT DOCUMENTS 5,270,808 A    12/1993  Tanioka
5,319,472 A    6/1994  Hill et al.
(Continued)

FOREIGN PATENT DOCUMENTS

JP    2003-060983 A    2/2003
JP    2006-121138 A    5/2006

OTHER PUBLICATIONS

D. Jang,"Color Fringe Correction Based on Image Fusion" published in ICIP 2014 on Oct. 27-30, 2014 in Paris in France, 5 pages.
(Continued)

*Primary Examiner* — Tuan Ho
*Assistant Examiner* — Marly Camargo
(74) *Attorney, Agent, or Firm* — Harness, Dickey & Pierce P.L.C.

(57) ABSTRACT

In an image processing device, a color transformation circuit is configured to generate a color difference based on a first image of normal exposure and a second image of under exposure. A color fringe detection circuit is configured to detect color fringe in the first image, and to generate color fringe detection information based on the detected color fringe. A weight map formation circuit is configured to generate a weight map based on the color fringe detection information and the color difference. An image fusion circuit is configured to generate a third image, in which the detected color fringe is suppressed, based on the color difference and the weight map.

19 Claims, 16 Drawing Sheets

(51) Int. Cl.
*G06T 7/40* (2006.01)
*H04N 9/79* (2006.01)
*G06T 5/00* (2006.01)

(58) Field of Classification Search
USPC ....... 382/162, 163, 164, 165, 166, 167, 254, 382/274, 275; 348/242, 222.1, 221.1, 252, 348/60, 182, 223.1, 256, 234, 450, 453, 348/587, 586, 592, 631, 229.1, 444
See application file for complete search history.

(56) References Cited

U.S. PATENT DOCUMENTS

| | | | |
|---|---|---|---|
| 5,434,683 | A | 7/1995 | Sekine et al. |
| 5,477,345 | A | 12/1995 | Tse |
| 6,256,062 | B1 | 7/2001 | Endo |
| 6,970,597 | B1 | 11/2005 | Olding et al. |
| 7,053,935 | B2 | 5/2006 | Guimaraes et al. |
| 7,577,292 | B2 | 8/2009 | Kang |
| 7,719,606 | B2 | 5/2010 | Wallace |
| 8,379,977 | B2 | 2/2013 | Chuang et al. |
| 8,587,705 | B2 | 11/2013 | Stanhill |
| 8,600,188 | B2 | 12/2013 | Segall |
| 8,638,342 | B2 | 1/2014 | Cote et al. |
| 2010/0177962 | A1* | 7/2010 | Kalman ................ G06T 5/003 382/167 |
| 2010/0303350 | A1* | 12/2010 | Demandolx ............. H04N 1/58 382/167 |
| 2011/0158515 | A1* | 6/2011 | Chuang ................... H04N 1/58 382/163 |
| 2013/0050545 | A1* | 2/2013 | Komatsu ............... H04N 9/646 348/242 |
| 2013/0050546 | A1 | 2/2013 | Kano |
| 2014/0193069 | A1 | 7/2014 | Kim et al. |
| 2016/0180505 | A1 | 6/2016 | Kim et al. |

OTHER PUBLICATIONS

I.Yerushalmy,"Digital image forgery detection based on lens and sensor aberration" Int. J. of Computer Vision, vol. 92, No. 1, 21 pages, Mar. 2011.
P. Mouroulis, "Geometrical Optics and Optical Design" London, U.K.: Oxford Univ. Press, 1997, 7 pages.
S. Chung, "Removing chromatic aberration by digital image processing" Optical Engineering, vol. 49(6), 10 pages, Jun. 2010.
H. Ju, "Colour fringe detection and correction in YCbCr colour space" IET Image Process., 2013, vol. 7, Iss. 4, 10 pages.
J. Chang, "Correction of axial and lateral chromatic aberration with false color filtering" IEEE Image Processing, vol. 22, No. 3, 13 pages, Mar. 2013.
K. He, "Guided Image Filtering" in IEEE Trans. Pattern Analysis and Machine Intelligence, vol. 35, 13 pages, Jun. 2013.
S. Li, "Image Fusion with Guided Filtering" IEEE Transactions on Image Processing, vol. 22, No. 7, Jul. 2013, 12 pages.
S. Pei, "Effective Color Interpolation in CCD Color Filter Arrays Using Signal Correlation" IEEE Trans. Circuits and System for Video Technology, vol. 13, No. 6, 11 pages, Jun. 2003.
J. Adams, "Color Processing in Digital Cameras" IEEE Micro, vol. 18, No. 6, 11 pages, Nov./Dec. 1998.
N. Koren, "The Imatest program: comparing cameras with different amounts of sharpening" in Proc. SPIE International Symposium on Electronic Imaging, vol. 6069, 9 pages, San Jose, CA, Jan. 2006.
Sprow, Web site—Sprow and P. zolliker's HDR Datebase, EMPA Media Technology Available: <http://empamedia.ethz.ch/hdrdatabase/>, 5 pages, 2014.
C. Jung, "Color Fringe Correction Using Guided image Filtering" published in ISCE 2014 on Jun. 22-25, 2014 in Juju Island in Korea, 2 pages.
V. Kaufmann, "Elimination of color fringes in digital photographs caused by later chromatic aberration" in Proc. 20th Int. Comm. Int. Phtogramn. Archit. Symp. Conf., Oct. 2005, 6 pages.
T. Boult, "Correcting chromatic aberrations using image warping" in Proc. IEEE Conf. Comput. Vis. Pattern Recognit., 15 pages, Jun. 1992.
G. Petschnigg, "Digital photography with flash and no-flash image pairs" ACM Trans. Graphics, vol. 23, No. 3, 9 pages, 2004.
United States Office Action dated Aug. 12, 2016 in co-pending U.S. Appl. No. 14/741,661.

* cited by examiner

20

21

22

33

34

81

82

101

102

IMAGE PROCESSING DEVICES FOR SUPPRESSING COLOR FRINGE, AND IMAGE SENSOR MODULES AND ELECTRONIC DEVICES INCLUDING THE SAME

CROSS-REFERENCE TO RELATED APPLICATION(S)

This application claims priority under 35 U.S.C. §119 to Korean Patent Application No. 10-2014-0181815 filed on Dec. 16, 2014, the entire contents of which are incorporated herein by reference.

BACKGROUND

Field

One or more example embodiments of inventive concepts relate to image processing devices, for example, image processing devices capable of suppressing and/or removing color fringe, and image sensor modules and electronic devices having the same.

Description of Related Art

Colors of light have different wavelengths. When a digital camera captures a real scene, a lens may not focus all colors to a convergence point. Accordingly, color distortion may occur around the boundary of objects of a digital color image. The color distortion may appear differently according to exposure of the digital camera. Moreover, as resolution of digital color images increases, or when digital cameras are used for more detailed shooting, color distortion may become worse.

SUMMARY

One or more example embodiments of inventive concepts provide image processing devices capable of suppressing and/or removing color fringe.

One or more other example embodiments of inventive concepts provide image sensor modules including image processing devices capable of suppressing and/or removing color fringe.

One or more other example embodiments of inventive concepts provide mobile devices having an application processor including an image processing device capable of suppressing and/or removing color fringe.

The technical objectives of inventive concepts are not limited to the above disclosure. Other objectives may become apparent to those of ordinary skill in the art based on the following descriptions.

In accordance with at least one example embodiment, an image processing device includes a color transformation circuit configured to receive a first image of normal exposure and a second image of under exposure and generate a color difference, a color fringe detection circuit configured to detect color fringe in the first image, and to generate color fringe detection information based on the detected color fringe, a weight map formation circuit configured to generate a weight map based on the color fringe detection information and the color difference, and an image fusion circuit configured to generate a third image in which the detected color fringe is suppressed and/or removed based on the color difference and the weight map.

In at least some example embodiments, each of the first image and the second image may include a red channel, a green channel, and a blue channel. The color difference may include a pixel difference between the red channel and the green channel and a pixel difference between the blue channel and the green channel.

The color fringe detection information may include information about an area of the first image with the color fringe and an area of the first image without the color fringe.

The weight map may be generated using at least one of a guided filter, a wavelet transform, a curvelet transform, and Markov random fields.

The image fusion circuit may generate the third image based on a green channel with respect to the first image.

Each of the first image and the second image may be generated by controlling at least one of a shutter speed, a diaphragm, and a value of an international organization for standardization (ISO).

The color transformation circuit may transform the first and second images from a RGB color space to a color difference space.

The second image may not include color fringe.

In accordance with at least one other example embodiment of inventive concepts, an image sensor module includes an image sensor, and an image processing device configured to receive a first image of normal exposure and a second image of under exposure from the image sensor. The image processing device includes a color transformation circuit configured to generate a color difference based on the first image and the second image, a color fringe detection circuit configured to detect color fringe in the first image, and to generate color fringe detection information based on the detected color fringe, a weight map formation circuit configured to generate a weight map based on the color fringe detection information and the color difference, and an image fusion circuit configured to generate a third image in which the detected color fringe is suppressed and/or removed based on the color difference and the weight map.

According to at least some example embodiments, each of the first image and the second image may include a red channel, a green channel, and a blue channel. The color difference may include a pixel difference between the red channel and the green channel and a pixel difference between the blue channel and the green channel.

The color fringe detection information may include information about an area of the first image with the color fringe and an area of the first image without the color fringe.

The weight map may be generated using any one of a guided filter, a wavelet transform, a curvelet transform, and Markov random fields.

The image fusion circuit may generate the third image based on a green channel with respect to the first image.

The image sensor may be configured to generate each of the first image and the second image by controlling at least one of a shutter speed, a diaphragm, and a value of an ISO.

The color transformation circuit may transform the first and second images from a RGB color space to a color difference space.

According to at least one other example embodiment, an image processing device includes a color transformation circuit and an image fusion circuit. The color transformation circuit is configured to generate color difference information based on a first image having a first exposure and a second image having a second exposure, the first exposure being greater than the second exposure, and the color difference information being indicative of first color differences between color channels of the first image and second color differences between color channels of the second image. The image fusion circuit is configured to generate an output image based on the color difference information and a green channel of the first image.

According to at least some example embodiments, the image fusion circuit may be further configured to generate a fused color difference for the first and second images based on the color difference information, and generate the output image by combining the fused color difference with the green channel of the first image.

The image processing device may further include a color fringe detection circuit configured to generate color fringe detection information based on detected chromatic aberration in the first image, and a weight map formation circuit configured to generate a weight map based on the color fringe detection information and the color difference information. The image fusion circuit may be further configured to generate the fused color difference based on the color difference information and the generated weight map.

The first image may include a first red channel, a first blue channel and a first green channel. The first color differences may include a pixel intensity difference between the first red channel and the first green channel and a pixel intensity difference between the first blue channel and the first green channel. The second image may include a second red channel, a second blue channel and a second green channel. The second color differences may include a pixel intensity difference between the second red channel and the second green channel and a pixel intensity difference between the second blue channel and the second green channel.

The first image may include chromatic aberration, and the second image may not include chromatic aberration.

BRIEF DESCRIPTION OF THE DRAWINGS

Inventive concepts will become more apparent from the more particular description of example embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION

Figure 1A:
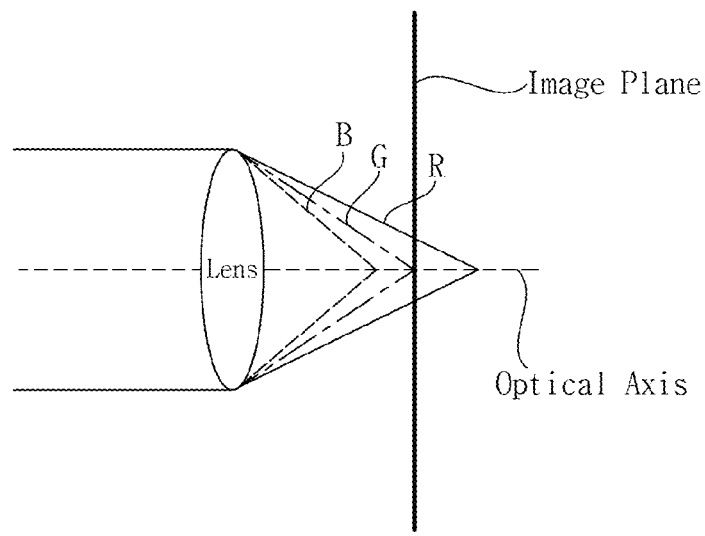
FIGS. 1A and 1B are conceptual diagrams for describing example types of chromatic aberration.

Specific structural and functional details disclosed herein are merely representative for purposes of describing example embodiments of inventive concepts, however, example embodiments may be embodied in many alternate forms and should not be construed as limited to example embodiments set forth herein.

While inventive concepts are susceptible to various modifications and alternative forms, specific embodiments thereof are shown by way of example in the drawings and will herein be described in detail. It should be understood, however, that there is no intent to limit inventive concepts to the particular forms disclosed, but on the contrary, inventive concepts are to cover all modifications, equivalents, and alternatives falling within the spirit and scope of inventive concepts. It will be understood that, although the terms first, second, A, B, etc. may be used herein in reference to elements of inventive concepts, such elements should not be construed as limited by these terms. For example, a first element could be termed a second element, and a second element could be termed a first element, without departing from the scope of inventive concepts. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of inventive concepts is not intended to limit the scope of inventive concepts. The articles "a," "an," and "the" are singular in that they have a single referent, however, the use of the singular form in the present document should not preclude the presence of more than one referent. In other words, elements of inventive concepts referred to in singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which inventive concepts belong. It will be further understood that terms in common usage should also be interpreted as is customary in the relevant art and not in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, example embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing image sensors, image sensing modules, digital cameras, electronic devices, such as smartphones, personal digital assistants, laptop or tablet computers, display devices, etc. Such existing hardware may include one or more Central Processing Units (CPUs), graphics processing units (GPUs), image processors, system-on-chip (SOC) devices, digital signal processors (DSPs), application-specific-integrated-circuits, field programmable gate arrays (FPGAs) computers, or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of inventive concepts will be described below in more detail with reference to the attached drawings.

Figure 1B:
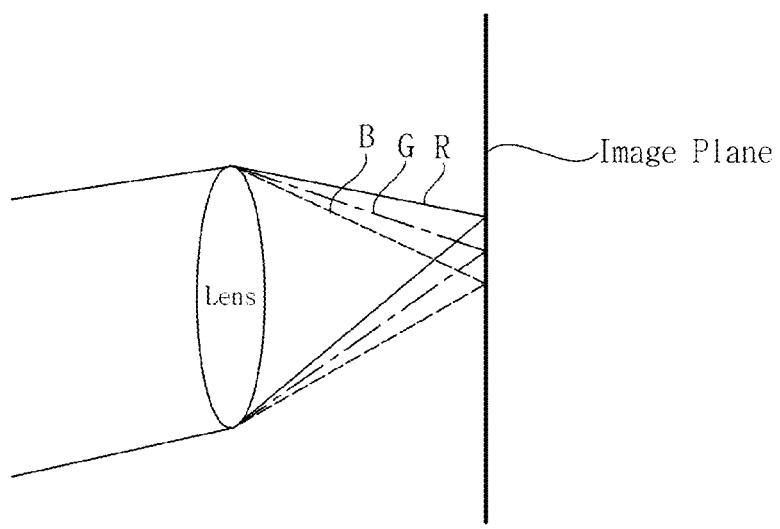

FIGS. 1A and 1B are conceptual diagrams for describing example types of chromatic aberration. More specifically, FIG. 1A shows an example of axial chromatic aberration (ACA), and FIG. 1B shows an example of lateral chromatic aberration (LCA). Chromatic aberration is also referred to as color fringe.

Referring to FIG. 1A, an image is projected on an image plane through a lens based on an optical axis. The image may include a red R channel, a green G channel, and a blue B channel.

Here, an image of the G channel forming the image coincides with a focal point, whereas an image of the B channel is focused in front of the focal point and an image of the R channel is focused behind the focal point. As a result, the image may be blurred.

Referring to FIG. 1B, an image passes through a lens at an oblique angle, and the image is projected on an image plane. Here, each of an image of the R channel, an image of the G channel, and an image of the B channel is focused at a different point on the image plane. Accordingly, the image may include geometric errors.

Figure 2A:
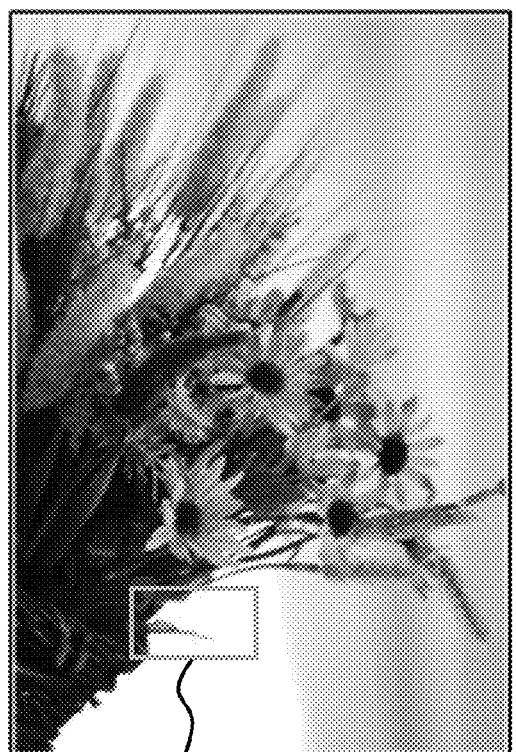
FIG. 2A is an image for describing an example color fringe.

FIG. 2A is an image for describing example color fringe.

In FIG. 2A, the area 21 includes color fringe in an image 20 shown in FIG. 2A.

Color fringe may include a green-cyan fringe, a purple fringe, and a green-red fringe.

Figure 2B:
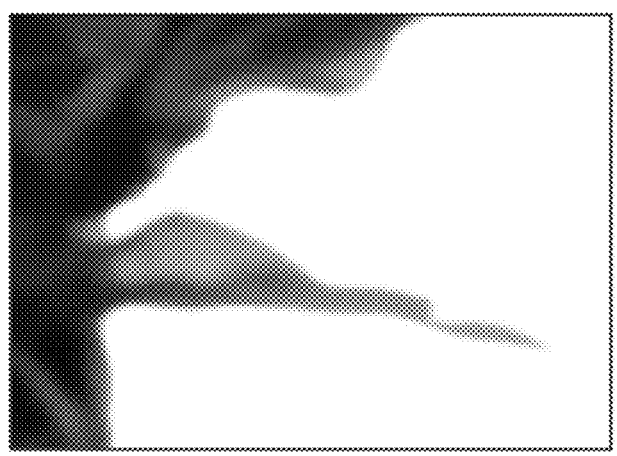
FIG. 2B is an enlarged part of the image shown in FIG. 2A.

FIG. 2B is an enlarged image apart of the image shown in FIG. 2A. More specifically, the image 22 shown in FIG. 2B is an enlarged image of the part 21 of the image 20 shown in FIG. 2A. The image 22 includes a green-cyan fringe. An edge of the image where color fringe occurs may include image blurring.

Figure 3A:
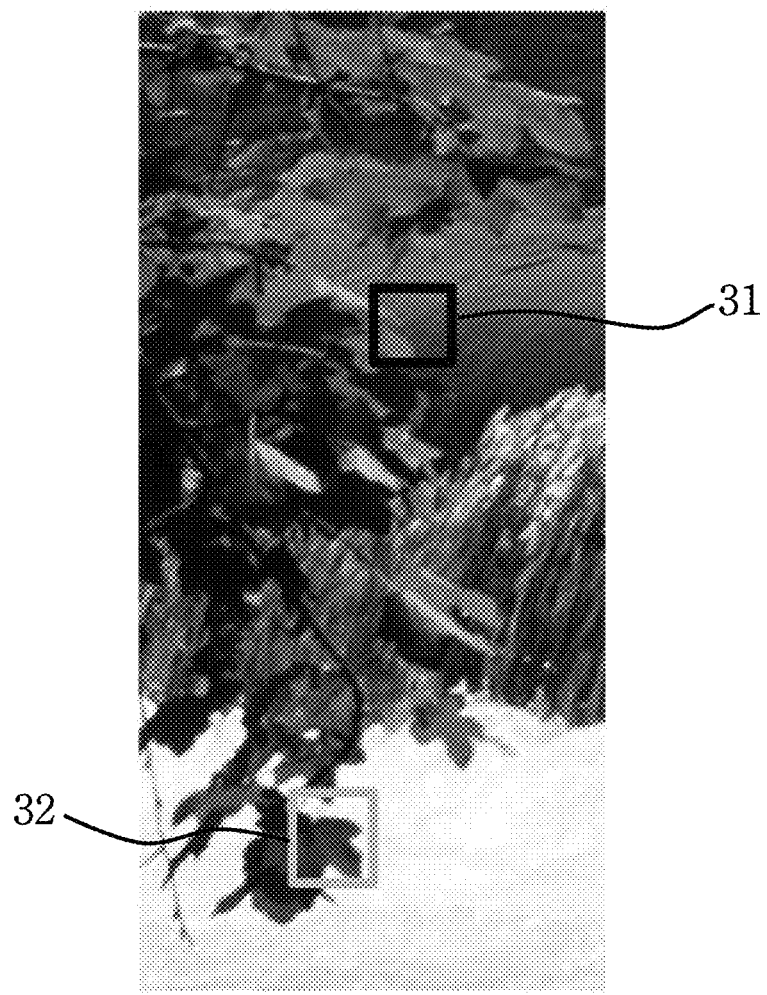
FIG. 3A is an image for describing another example color fringe.

FIG. 3A is another example image for describing color fringe.

Referring to FIG. 3A, an image 30 includes a first area 31 without color fringe and a second area 32 with color fringe.

Figure 3B:
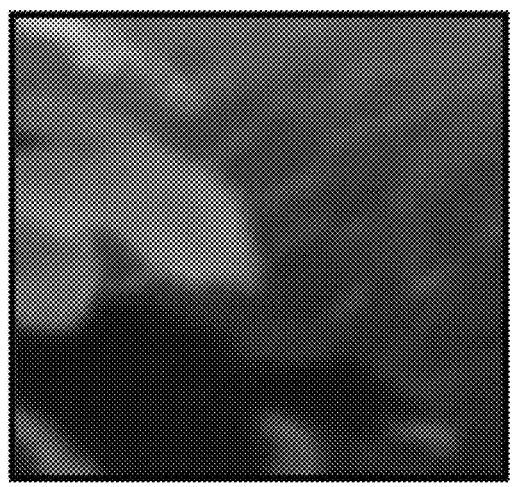
FIG. 3B is an enlarged image of the first area 31 of the image shown in FIG. 3A.

FIG. 3B is an enlarged image of the first area 31 of the image shown in FIG. 3A.

Referring to FIG. 3B, an enlarged image 33 of the first area 31 does not include color fringe.

Figure 3C:
FIG. 3C is an enlarged image of the second area 32 of the image shown in FIG. 3A.

FIG. 3C is an enlarged image of the second area 32 of the image shown in FIG. 3A.

Referring to FIG. 3C, an enlarged image 34 of the second area 32 includes color fringe. An edge of the image where color fringe occurs may include an image burring.

Figure 4:
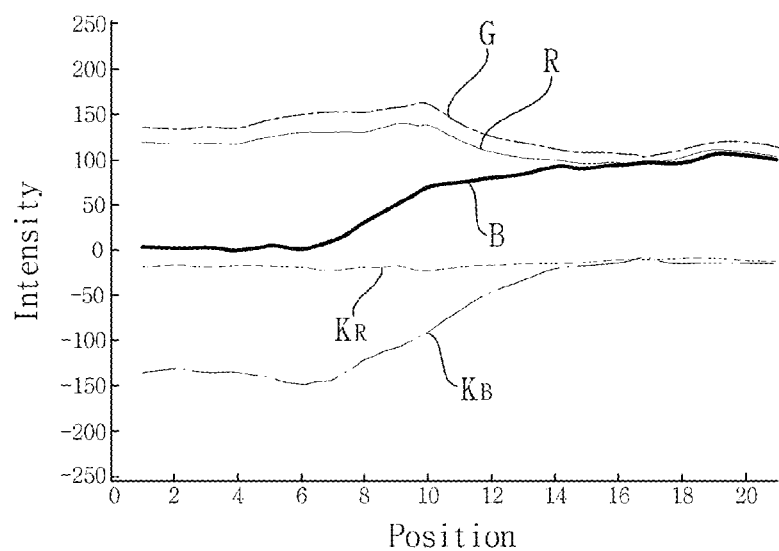
FIG. 4 is a graph illustrating example pixel values with respect to RGB channels of the image shown in FIG. 3B.

FIG. 4 is a graph illustrating example pixel values with respect to RGB channels of the image shown in FIG. 3B.

Referring to FIG. 4, the abscissa is a coordinate of an image, and the ordinate is an intensity value (i.e., a pixel value).

Color difference values $K_B$ and $K_R$ are calculated according to Equation 1 shown below.

$$K_B = B - G,$$

$$K_R = R - G \qquad \text{[Equation 1]}$$

In Equation 1, $K_B$ is a color difference value between the blue (B) channel and the green (G) channel. $K_R$ is a color difference value between the red (R) channel and the green (G) channel.

Generally, color fringe does not occur in an area where a difference in pixel value is relatively small.

Figure 5:
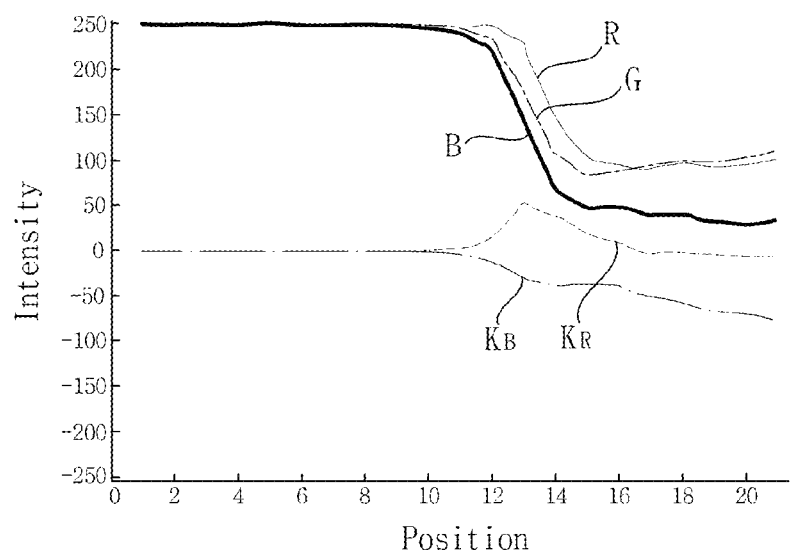
FIG. 5 is a graph illustrating example pixel values with respect to RGB channels of the image shown in FIG. 3C.

FIG. 5 is a graph illustrating example pixel values with respect to RGB channels of the image shown in FIG. 3C.

Referring to FIG. 5, the abscissa is a coordinate of an image, whereas the ordinate is an intensity value (i.e., a pixel value).

In an area where an R pixel value, a G pixel value, and a B pixel value change relatively rapidly, color fringe may occur. In this area, $K_B$ changes more than $K_R$.

Figure 6:
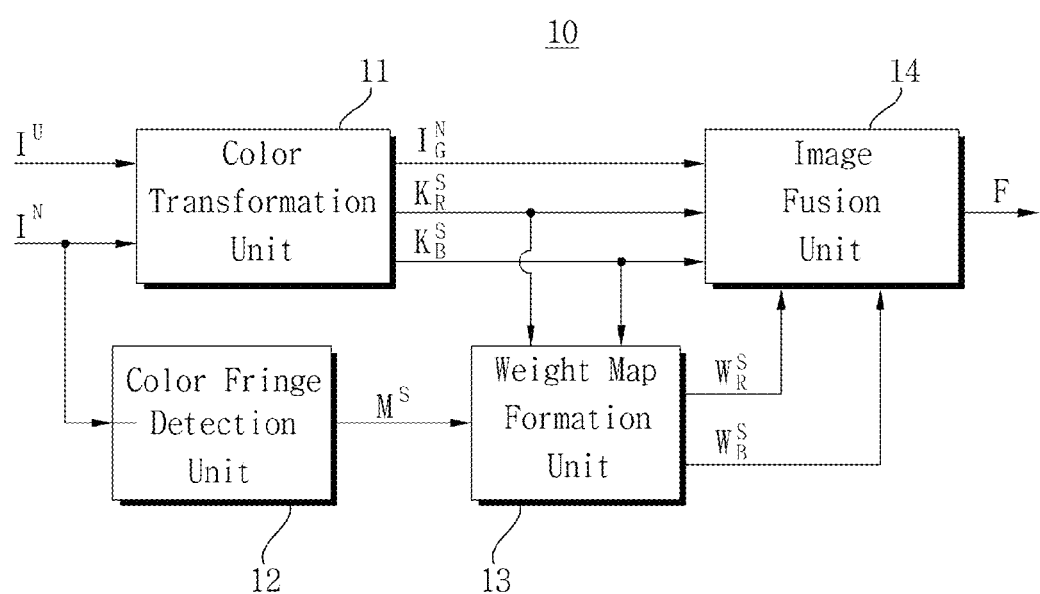
FIG. 6 is a block diagram illustrating an image processing device according to an example embodiment of inventive concepts.

FIG. 6 is a block diagram illustrating an image processing device, according to an example embodiment of inventive concepts.

Referring to FIG. 6, the image processing device 10 according to at least this example embodiment of inventive concepts may include a color transformation circuit (or unit) 11, color fringe detection circuit (or unit) 12, a weight map formation circuit (or unit) 13, and an image fusion circuit (or unit) 14.

The color transformation circuit 11 may receive a normal exposure image $I^N$ and a under exposure image $I^U$. For example, the color transformation circuit 11 may receive a relatively bright image $I^N$ and a relatively dark image $I^U$.

The exposure of an image may be determined according to a shutter speed, a diaphragm, and/or a value of an international organization for standardization (ISO).

The color transformation circuit 11 transforms an RGB color space into a color difference space. For example, image data may have a pixel value for each of an R channel, a G channel, and a B channel. The color transformation circuit 11 may transform the image data of the RGB color space into the color difference space of each of $K_R$ and $K_B$ based on the G channel according to Equation 2.

$$K_C^S = I_C^S - I_G^S \quad \text{[Equation 2]}$$

In Equation 2, superscript S denotes a type of an image, and S may include a normal exposure image $I^N$ and an under exposure image $I^U$. Subscript C denotes a R color and a B color of RGB colors. As described above with regard to Equation 1, $K_B$ denotes a color difference value between a blue channel and a green channel, and $K_R$ denotes a color difference value between a red channel and a green channel.

The color transformation circuit 11 transmits a G channel $I_G^N$ of the relatively bright image $I^N$ to the image fusion circuit 14.

Moreover, the color transformation circuit 11 may generate color difference space information $K_R^S$ using a difference $K_R^N$ between an R channel $I_R^N$ of the relatively bright image $I^N$ and a G channel $I_G^N$ of the relatively bright image $I^N$, and a difference $K_R^U$ between an R channel $I_R^U$ of the relatively dark image $I^U$ and a G channel $I_G^U$ of the relatively dark image $I^U$.

Likewise, the color transformation circuit 11 may generate color difference space information $K_B^S$ using a difference $K_B^N$ between a B channel $I_B^N$ of the relatively bright image $I^N$ and a G channel $I_G^N$ of the relatively bright image $I^N$, and a difference $K_B^U$ between a B channel $I_B^U$ of the relatively dark image $I^U$ and a G channel $I_G^U$ of the relatively dark image $I^U$.

The color transformation circuit 11 outputs the color difference space information $K_R^S$ and $K_B^S$ to the image fusion circuit 14. The color transformation circuit 11 will be described in more detail with regard to FIGS. 7A to 7C.

To fuse only color fringe areas according to Equation 2, the color fringe detection circuit 12 detects color fringe in the relatively bright image $I^N$. For example, the color fringe detection circuit 12 may detect an area where a specific condition corresponding to color fringe of an edge area of the relatively bright image $I^N$ is met.

For example, the color fringe detection circuit 12 may generate color fringe detection information $M^N$ according to Equation 3 shown below.

$$M^N(i,j) = \begin{cases} 0, & \text{if } I^N(i,j) \text{ is color fringe} \\ 1, & \text{otherwise} \end{cases} \quad \text{[Equation 3]}$$

In the color fringe detection information $M^N$, an area with color fringe is set to 0, whereas an area without color fringe is set to 1. In at least one example embodiment, the color fringe detection information $M^N$ may be implemented in binary form.

Further, the color fringe detection circuit 12 may give a weight value between 0 and 1 to an area with color fringe according to an intensity of the color fringe.

For example, the color fringe detection circuit 12 may give a weight value of 0 to an area with color fringe. Further, the color fringe detection circuit 12 may give a weight value of 1 to an area without color fringe. Likewise, the color fringe detection circuit 12 may give a weight value that is relatively close to 0 to an area around the area with color fringe.

The color fringe detection circuit 12 may generate $M^U$ according to Equation 4 shown below. In this example, $M^U$ may be calculated using complement of $M^N$ having a binary form.

$$M^U = 1 - M^N \quad \text{[Equation 4]}$$

The color fringe detection circuit 12 may mask a color fringe detection area according to Equation 3 or Equation 4. Thus, in FIG. 6, the color fringe detection information is denoted generally as $M^S$.

The color fringe detection information $M^S$ may include information about an area with the color fringe and an area without the color fringe in the relatively bright image $I^N$. The color fringe detection circuit 12 will be described in more detail with regard to FIGS. 8A and 8B.

The weight map formation circuit 13 may receive color difference space information $K_R^S$ and $K_B^S$ from the color transformation circuit 11. Moreover, the weight map formation circuit 13 may receive the color fringe detection information $M^S$ from the color fringe detection circuit 12.

To compose the relatively bright image $I^N$ and the relatively dark image $I^U$, the weight map formation circuit 13 may generate a weight map $W_C^S$ using a guided filter (GF) shown below in Equation 5. Moreover, the weight map formation circuit 13 may generate a weight map $W_C^S$ using, for example, a wavelet transform, a curvelet transform, Markov random fields, etc.

$$W_C^S = GF(M^S, K_C^S, r, \epsilon) \quad \text{[Equation 5]}$$

In Equation 5, r is a unit of a window size, and the weight map formation circuit 13 may generate a weight map in units of window sizes. Still referring to Equation 5, $\epsilon$ is a parameter (e.g., a penalizing parameter) according to the window size.

The weight map formation circuit 13 may generate weight map $W_R^S$ for the red channel and weight map $W_B^S$ for the blue channel using the GF given by Equation 5.

The image fusion circuit 14 may also receive the G channel $I_G^N$ of the relatively bright image $I^N$ from the color transformation circuit 11 along with the color difference space information, $K_R^S$ and $K_B^S$. Moreover, the image fusion circuit 14 may receive the weight maps $W_R^S$ and $W_B^S$ from the weight map formation circuit 13. The image fusion circuit 14 may generate a new image F according to Equations 6 to 8 shown below.

$$\overline{K}_C = W_C^N K_C^N + W_C^U K_C^U \quad \text{[Equation 6]}$$

The image fusion circuit 14 may apply a flat change of $K_R$ and $K_B$ in the relatively dark image $I^U$ to the relatively bright image $I^N$. Moreover, the image fusion circuit 14 may generate a new image using the weight maps from the weight map formation circuit 13.

The image fusion circuit 14 may generate a final image F according to Equation 6. For example, a G channel of the final image F is a G channel of the relatively bright image $I^N$, whereas a R channel and a B channel in the final image F may be transformed according to Equation 7 shown below. In Equation 7, subscript C denotes one of R and B Channels.

$$F_C = \overline{K}_C + I_G^N \quad \text{[Equation 7]}$$

As shown below in Equation 8, the image fusion circuit 14 uses the G channel as a reference channel.

$$F_G = I_G^N \quad \text{[Equation 8]}$$

Accordingly, the image fusion circuit 14 may generate the final image F where the color fringe is suppressed and/or removed from the image.

Figure 7A:
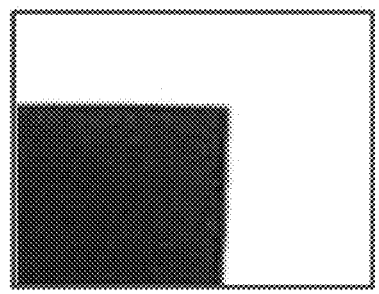
FIGS. 7A to 7C are images for describing example operation of the color transformation circuit shown in FIG. 6.
Figure 7B:
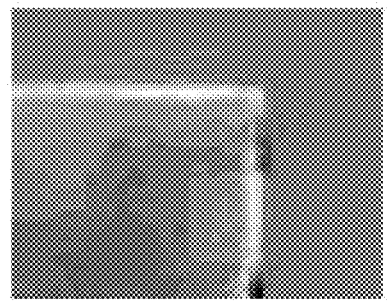
Figure 7C:
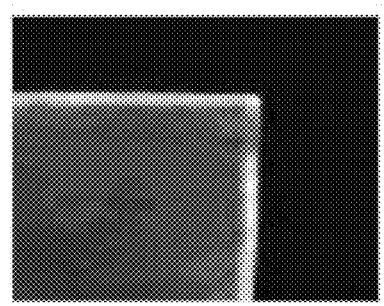

FIGS. 7A to 7C are images for describing example operation of the color transformation circuit 11 shown in FIG. 6.

Referring to FIGS. 6 to 7C, the color transformation circuit 11 transforms RGB color space into color difference space.

An image 71 shown in FIG. 7A is an input image corresponding to RGB color space. On the other hand, each of image 72 shown in FIG. 7B and image 73 shown in FIG. 7C corresponds to color difference space.

To more clearly show change, the image 72 shown in FIG. 7B is displayed by applying histogram equalization with respect to $K_R$. Likewise, to more clearly show change, the image 73 shown in FIG. 7C is displayed by applying histogram equalization with respect to $K_B$.

Generally, a value of each of $K_R$ and $K_B$ may monotonously increase or decrease in an area without color fringe. On the other hand, an area with the color fringe (e.g., an edge area) may have a relatively significant change. Accordingly, the image 72 shown in FIG. 7B and the image 73 shown in FIG. 7C may have difference pixel values that are different from environs in an edge area.

Figure 8A:
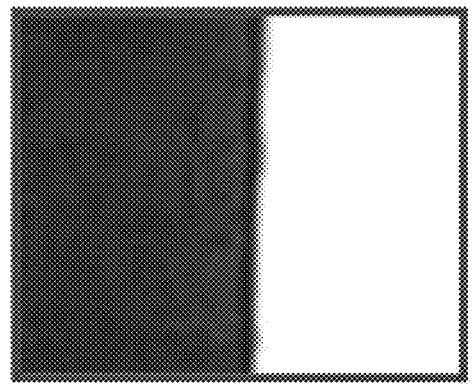
FIGS. 8A and 8B are images for describing example operation of the color fringe detection circuit shown in FIG. 6.
Figure 8B:
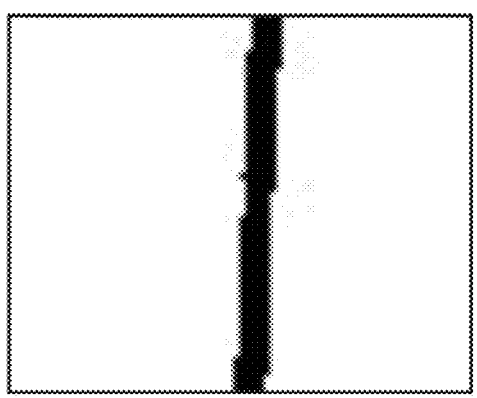

FIGS. 8A and 8B are images for describing example operation of the color fringe detection circuit 12 shown in FIG. 6.

Referring to FIGS. 6, 8A and 8B, the color fringe detection circuit 12 may generate color fringe detection information $M^N$ according to Equation 2. In one example, the color fringe detection information $M^N$ may be implemented in binary form.

The image 81 shown in FIG. 8A is an input image including color fringe.

The image 82 shown in FIG. 8B is an image where the color fringe is detected according to Equation 2. That is, a color fringe area is displayed with black color in the image 82 shown in FIG. 8B. Moreover, an area without color fringe is displayed with white color.

Figure 9:
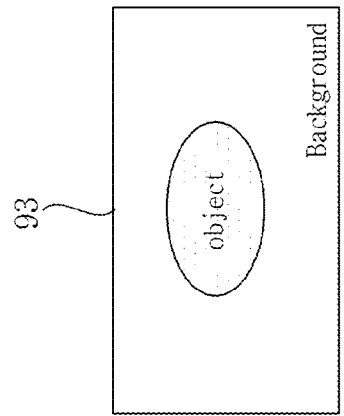
FIG. 9 is a conceptual diagram for describing example operation of the image processing device shown in FIG. 6.
Figure 9:
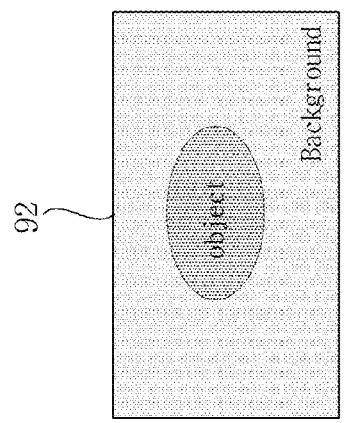
Figure 9:
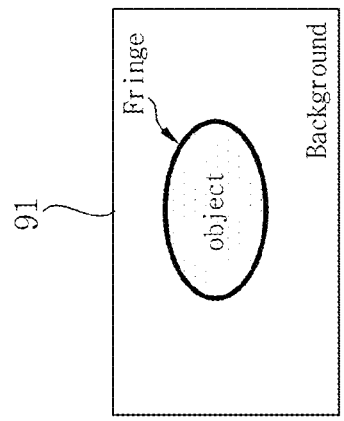

FIG. 9 is a conceptual diagram for describing example operation of the image processing device shown in FIG. 6.

Referring to FIGS. 6 and 9, the image processing device 10 may generate a new image 93 where a color fringe is suppressed and/or removed using a relatively bright image 91 and a relatively dark image 92.

For example, the relatively bright image 91 may include color fringe, whereas the relatively dark image 92 may not include color fringe.

Accordingly, the image processing device 10 may generate a new image 93 by using the relatively bright image 91 in an area where color fringe does not occur and the relatively dark image 92 in an area where color fringe occurs.

Figure 10A:
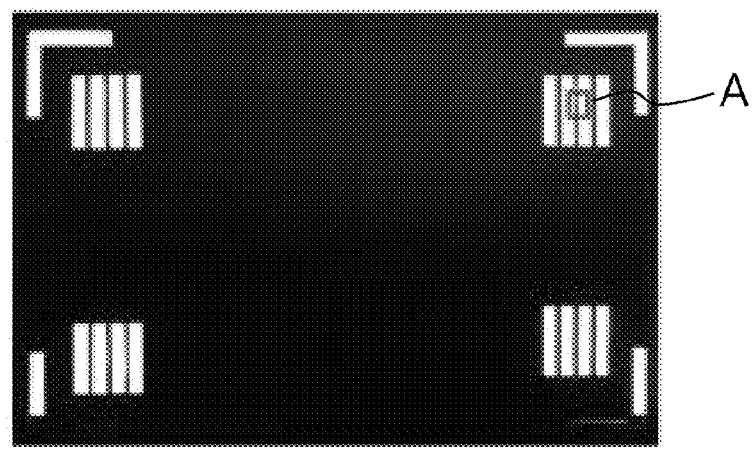
FIG. 10A shows an example of a relatively bright image.
Figure 10B:
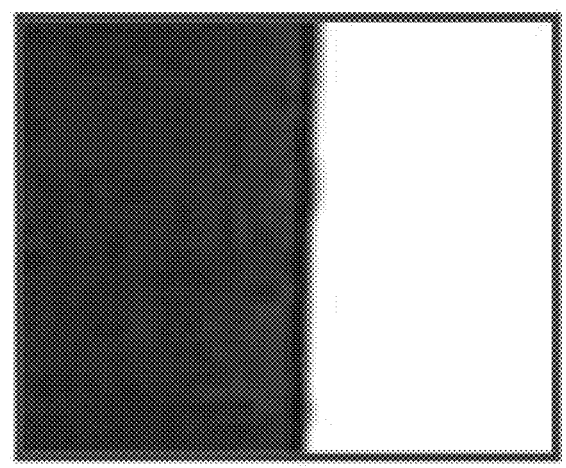
FIG. 10B shows a part of the image shown in FIG. 10A.

FIG. 10A shows an example of a relatively bright image.
FIG. 10B shows a part of the image shown in FIG. 10A.

The image 101 shown in FIG. 10A is a relatively bright image such as the relatively bright image 91 shown in FIG. 9. The image 101 shown in FIG. 10A may include color fringe in area A.

The enlarged image 102 shown in FIG. 10B is an image of the area A of the relatively bright image 101 shown in FIG. 10A. The image 102 shown in FIG. 10B may include color fringe.

Figure 11A:
FIG. 11A shows an example of a relatively dark image.
Figure 11B:
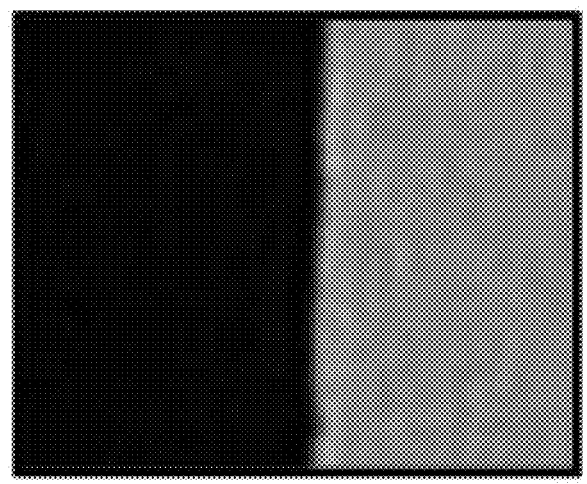
FIG. 11B shows a part of the image shown in FIG. 11A.

FIG. 11A shows an example of a relatively dark image.
FIG. 11B shows a part of the image shown in FIG. 11A.

The image 111 shown in FIG. 11A is a relatively dark image such as the relatively dark image 92 shown in FIG. 9. The image 111 shown in FIG. 11A may not include color fringe in area B.

The enlarged image 112 shown in FIG. 11B is an image of the area B of the relatively dark image 111 shown in FIG. 11A. The image 112 shown in FIG. 11B may not include color fringe.

Figure 12A:
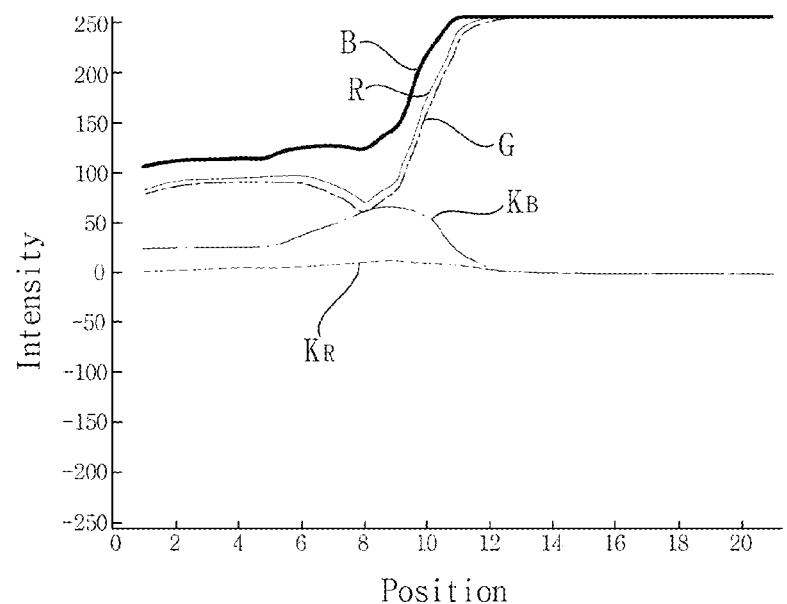
FIGS. 12A to 12C are graphs for describing an example embodiment of a method of driving the image processing device shown in FIG. 6.
Figure 12B:
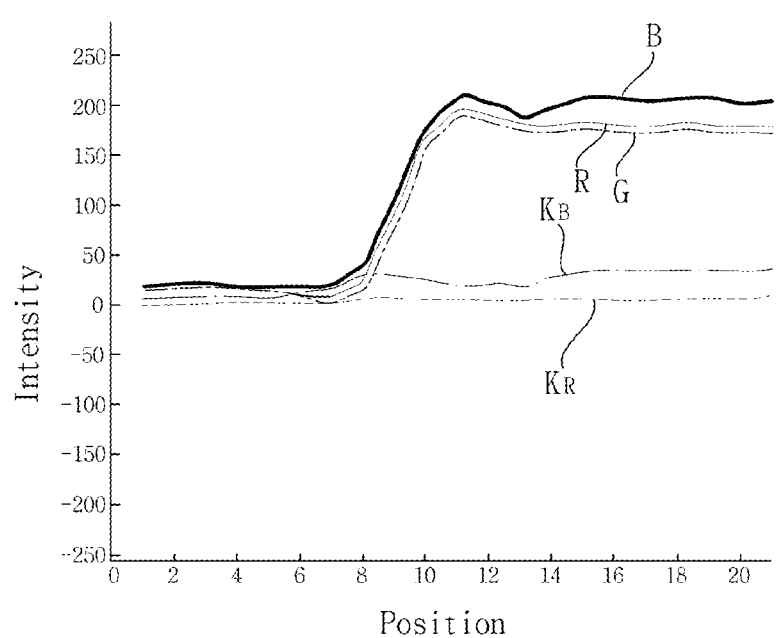
Figure 12C:
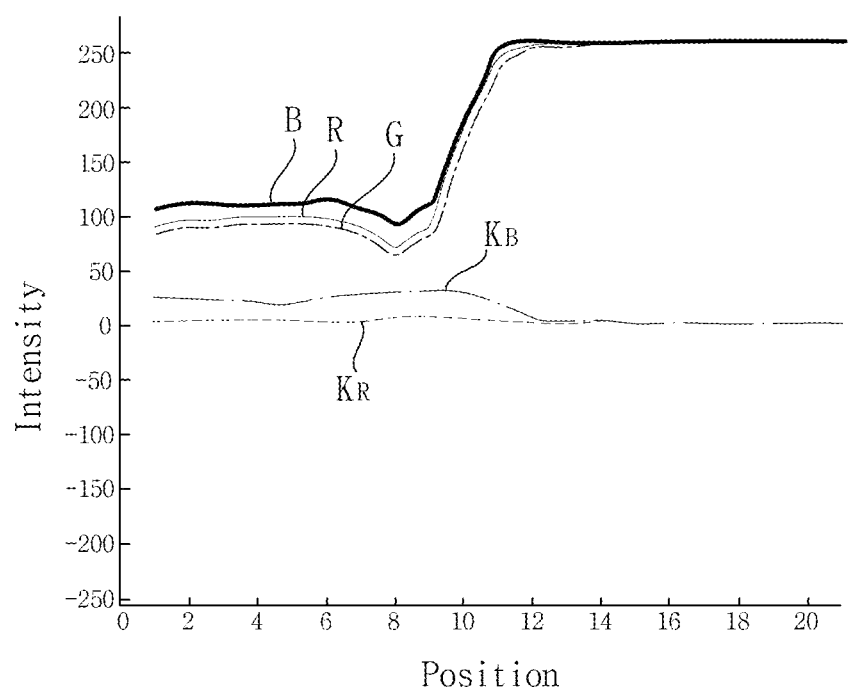

FIGS. 12A to 12C are example graphs for describing an example embodiment of a method of driving the image processing device shown in FIG. 6.

Specifically, FIG. 12A is an example graph corresponding to the relatively bright image $I^N$ in FIG. 6. FIG. 12B is an example graph corresponding to the relatively dark image $I^U$ in FIG. 6. Moreover, FIG. 12C is an example graph corresponding to the final image F in FIG. 6.

Referring to FIGS. 6 and 12A, when an edge of the relatively bright image $I^N$ includes color fringe, $K_R$ and $K_B$ may change significantly in the edge area. In FIG. 12A, $K_B$ increases rapidly.

Referring to FIGS. 6 and 12B, when an edge of the relatively dark image $I^U$ does not include color fringe, $K_R$ and $K_B$ may change monotonously in the edge area.

Referring to FIGS. 6 and 12C, when an edge of the final image F includes color fringe, $K_R$ and $K_B$ may still change monotonously in the edge area.

Figure 13:
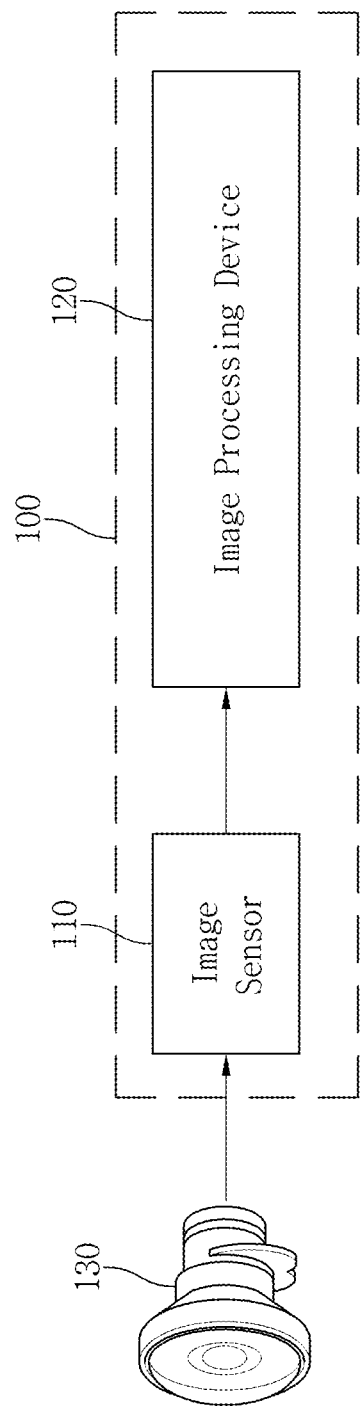
FIG. 13 is a block diagram illustrating an image sensor module including an image processing device, according to another example embodiment of inventive concepts.

FIG. 13 is a block diagram illustrating an image sensor module including an image processing device, according to an example embodiment of inventive concepts.

Referring to FIG. 13, the image sensor module 100 may include an image sensor 110 and an image processing device 120. In at least this example embodiment, the image sensor module 100 may be installed in a digital camera device, a smart-phone, a tablet, or other electronic device.

The image sensor 110 may acquire image data of an object through a lens 130. The image sensor 110 transmits the image data to the image processing device 120. In at least this example embodiment, the image sensor 110 may include a Complementary-metal-oxide-semiconductor (CMOS) image sensor or charge coupled device (CCD) image sensor.

In at least this example embodiment, the image processing device 120 may include the image processing device 10 shown in FIG. 6.

Figure 14:
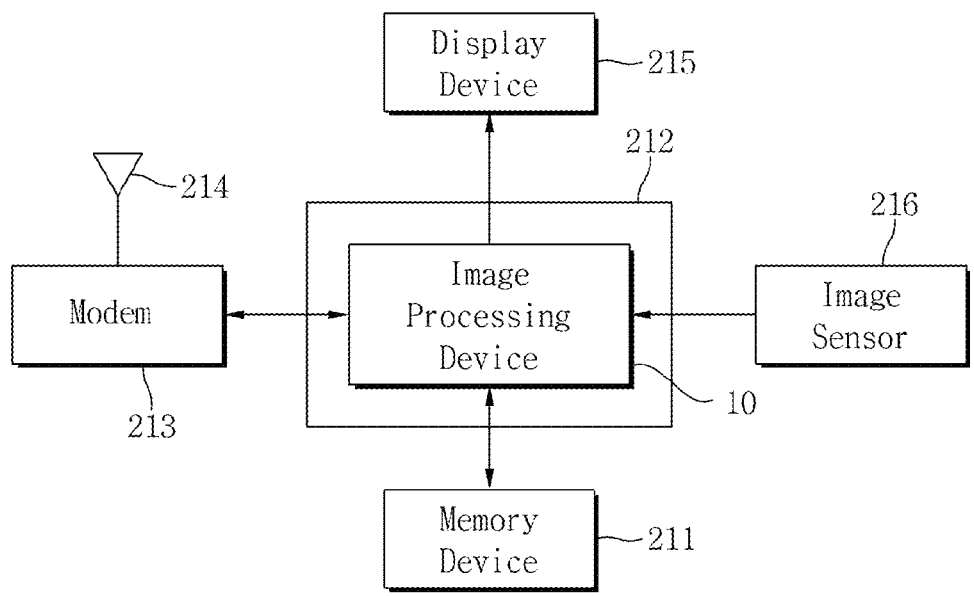
FIG. 14 is a block diagram of a mobile device including the image processing device shown in FIG. 6, according to an example embodiment of inventive concepts.

FIG. 14 is a block diagram of a mobile device 210 including the image processing device shown in FIG. 6, according to an example embodiment of inventive concepts.

Referring to FIG. 14, the mobile device 210 may be embodied in a smart-phone, a table personal computer (PC), a ultra mobile personal computer (UMPC), a personal digital assistant (PDA), a portable multimedia player (PMP), an MP3 player, an MP4 player, or other electronic device.

The mobile device 210 may include a memory device 211, an application processor 212 including a memory controller for controlling the memory device 211, a modem 213, an antenna 214, and a display device 215.

The modem 213 may receive and transmit a radio signal through the antenna 214. For example, the modem 213 may convert the radio signal through the antenna 214 into a signal to be processed in the application processor 212. In at least this example embodiment, the modem 213 may be a longterm evolution (LTE) transceiver, a high speed downlink packet access/wideband code division multiple access (HSDPA/WCDMA) transceiver, a global system for mobile communications (GSM) transceiver, or other wireless transceiver.

Accordingly, the application processor 212 may process a signal output from the modem 213, and transmit the processed signal to the display device 215. Further, the modem 213 may convert a signal transmitted from the application processor 212 into the radio signal, and output the converted radio signal to an external device through the antenna 214.

Further, the application processor 212 includes an image processing device 10. In at least this example embodiment, the image processing device 10 may be the image processing device 10 shown in FIG. 6.

Figure 15:
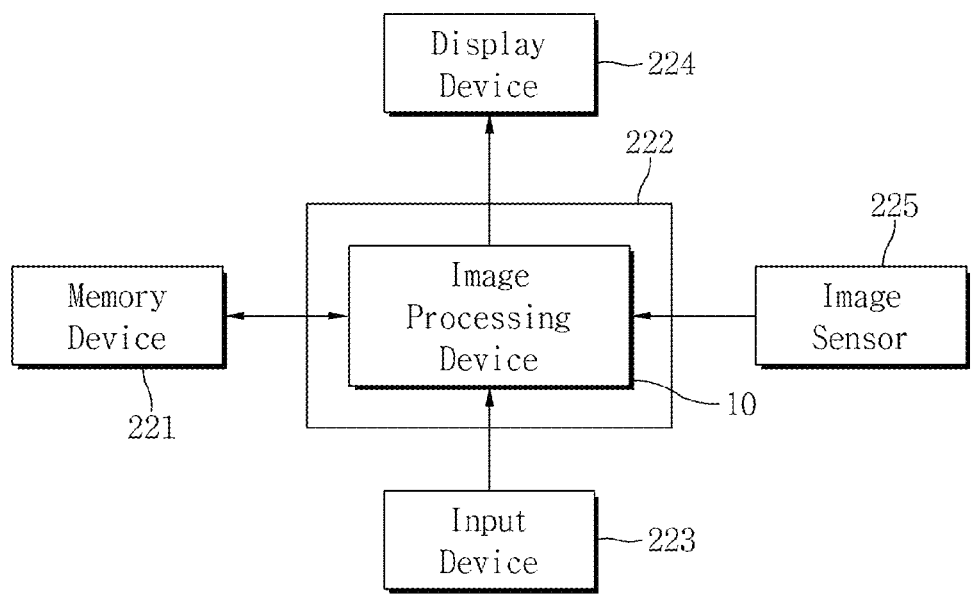
FIG. 15 is a block diagram of a mobile device including the image processing device shown in FIG. 6, according to another example embodiment of inventive concepts.

FIG. 15 is a block diagram of a mobile device 220 including the image processing device shown in FIG. 6, according to an example embodiment of inventive concepts.

Referring to FIG. 15, the mobile device 220 may be embodied as either an image process device (e.g., a digital camera) or a mobile phone on which a digital camera is attached (or included), a tablet PC, or other electronic device.

The mobile device 220 includes a memory device 221, an application processor 222 including a memory controller for controlling a data processing operation of the memory device 221, an input device 223, and a display device 224.

The input device 223 is a device for inputting a control signal for controlling an operation of the application processor 222 or data to be processed by the application processor 222, and may be implemented as a pointing device such as a touch screen, touch pad and computer mouse, a keypad, a keyboard, etc.

The application processor 222 displays data stored in the memory device 221 through the display device 224. The application processor 222 may control overall operations of the mobile device 220.

Further, the application processor 222 includes an image processing device 10. In at least this example embodiment, the image processing device 10 may be the image processing device 10 shown in FIG. 6.

Figure 16:
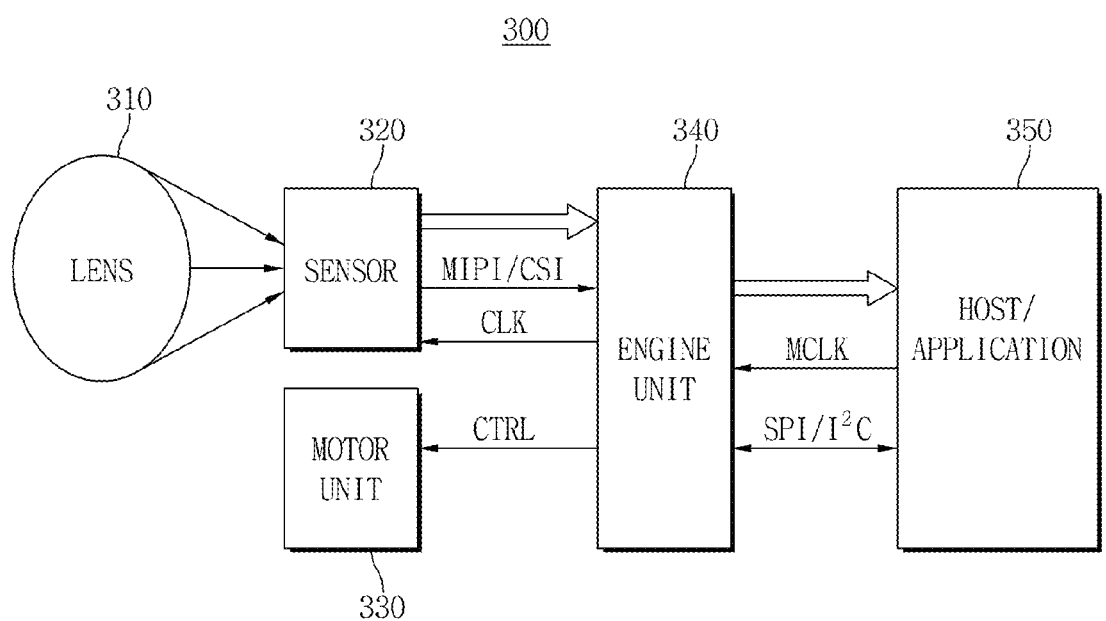
FIG. 16 is a block diagram illustrating a camera system according to an example embodiment of inventive concepts.

FIG. 16 is a block diagram illustrating a camera system according to an example embodiment of inventive concepts.

Referring to FIG. 16, the camera system 300 may include a lens 310, an image sensor 320, a motor unit (or circuit or processing circuit) 330, an engine unit (or circuit or processing circuit) 340, and a host/application unit (or circuit or processing circuit) 350. The sensor 320 may include an image sensor 110 and the image processor 120 shown in FIG. 13.

In at least this example embodiment, the camera system may include a digital camera device.

The lens 310 collects incident light on an integration region (e.g., a photodiode) of the image sensor 320.

The image sensor 320 generates image data based on the incident light through the lens 310. The image sensor 320 may provide the image data based on a clock signal CLK. In at least this example embodiment, the image sensor 320 may interface with the engine unit 340 through a mobile industry processor interface (MIPI) and/or a camera serial interface (CSI).

The motor unit 330 may control a focus of the lens 310 in response to a received control signal CTRL from the engine unit 340, or perform shuttering.

The engine unit 340 controls the image sensor 320 and the motor unit 330. Further, the engine unit 340 may generate YUV data including a distance from a subject, a luminance component, a difference between the luminance component and a blue component, and a difference between the luminance component and a red component based on a distance received from the image sensor 320 and image data, or generate compression data (e.g., joint photography experts group (JPEG) data).

The engine unit 340 may be connected to the host/application unit 350. The engine unit 340 provides YUV data or JPEG data to the host/application unit 350 based on a master clock MCLK. Further, the engine unit 340 may interface with the host/application unit 350 through a serial peripheral interface (SPI) and/or an inter-integrated circuit (I2C).

In at least this example embodiment, the engine unit 340 may correct a distorted image from the image sensor 320 and enhance the corrected image. The engine unit 340 may include the image processing device 10 shown in FIG. 6.

Figure 17:
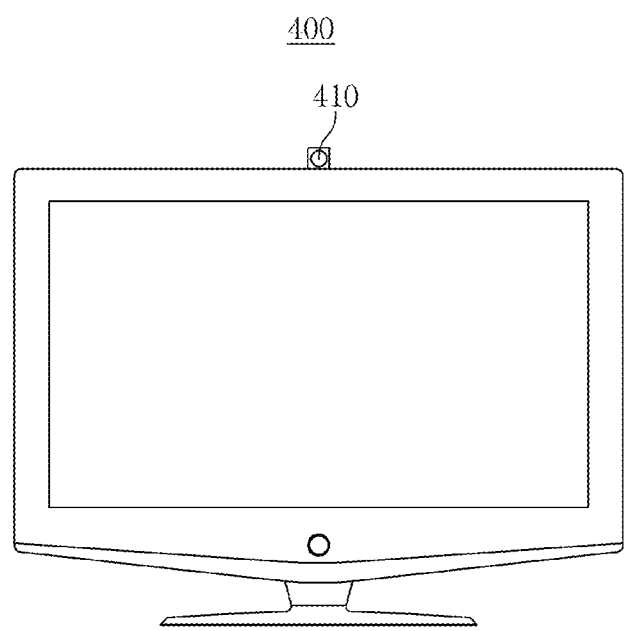
FIG. 17 is a display device including the image processing device shown in FIG. 13.

FIG. 17 is a display device 400 including the image processing device shown in FIG. 13, according to an example embodiment of inventive concepts.

Referring to FIG. 17, a display device 400 may be embodied in a display device installed in a smart TV, a monitor, or various mobile (or other electronic) devices.

The display device 400 may include a camera device 410. When the display device 400 is the smart TV, various applications may be installed in the display device 400.

For example, a user may perform a video call application using the camera device 410 installed in the display device 400.

In at least this example embodiment, the camera device 410 may include the image sensor module 100 shown in FIG. 13.

Image processing devices according to one or more example embodiments of inventive concepts may suppress and/or remove color fringe in images. Accordingly, image processing devices may correct for color distortion in images.

While inventive concepts have been described with reference to example embodiments, it will be understood by those skilled in the art that various changes and modifications may be made without departing from the spirit and scope of inventive concepts as defined by the appended claims.

Inventive concepts may be applied to application processors including image processing devices. Further, inventive concepts may be applied to mobile devices or wearable devices including application processors.

Although a few example embodiments have been described, those skilled in the art will readily appreciate that many modifications are possible without materially departing from the novel teachings and advantages. Accordingly, all such modifications are intended to be included within the scope of inventive concepts as defined in the claims.

What is claimed is:

1. An image processing device comprising:
a color transformation circuit configured to generate a color difference based on a first image of normal exposure and a second image of under exposure;
a color fringe detection circuit configured to detect color fringe in the first image, and to generate color fringe detection information based on the detected color fringe in the first image;
a weight map formation circuit configured to generate a weight map based on the color fringe detection information and the color difference; and an image fusion circuit configured to generate, based on the color difference and the weight map, a third image in which the detected color fringe is suppressed.

2. The image processing device of claim 1, wherein each of the first image and the second image include a red channel, a green channel, and a blue channel; and
the color difference includes a first pixel difference between the red channel and the green channel and a second pixel difference between the blue channel and the green channel.

3. The image processing device of claim 1, wherein the color fringe detection information includes information associated with an area of the first image with the color fringe and an area of the first image without the color fringe.

4. The image processing device of claim 1, wherein the weight map formation circuit is further configured to generate the weight map using at least one of a guided filter, a wavelet transform, a curvelet transform, and Markov random fields.

5. The image processing device of claim 1, wherein the image fusion circuit is further configured to generate the third image based on a green channel of the first image.

6. The image processing device of claim 1, wherein each of the first image and the second image is generated by controlling at least one of a shutter speed, a diaphragm, and a value of an international organization for standardization (ISO).

7. The image processing device of claim 1, wherein the color transformation circuit is further configured to transform the first and second images from a RGB color space to a color difference space.

8. The image processing device of claim 1, wherein the second image does not include color fringe.

9. An image sensor module comprising:
an image sensor; and
an image processing device configured to receive a first image of normal exposure and a second image of under exposure from the image sensor, the image processing device including,
a color transformation circuit configured to generate a color difference based on the first image and the second image,
a color fringe detection circuit configured to detect color fringe in the first image, and to generate color fringe detection information based on the detected color fringe,
a weight map formation circuit configured to generate a weight map based on the color fringe detection information and the color difference, and
an image fusion circuit configured to generate, based on the color difference and the weight map, a third image in which the detected color fringe is suppressed.

10. The image sensor module of claim 9, wherein each of the first image and the second image include a red channel, a green channel, and a blue channel; and
the color difference includes a first pixel difference between the red channel and the green channel and a second pixel difference between the blue channel and the green channel.

11. The image sensor module of claim 9, wherein the color fringe detection information includes information about an area of the first image with the color fringe and an area of the first image without the color fringe.

12. The image sensor module of claim 9, wherein the weight map formation circuit is further configured to generate the weight map using at least one of a guided filter, a wavelet transform, a curvelet transform, and Markov random fields.

13. The image sensor module of claim 9, wherein the image fusion circuit is further configured to generate the third image based on a green channel of the first image.

14. The image sensor module of claim 9, wherein the image sensor is configured to generate each of the first image and the second image by controlling at least one of a shutter speed, a diaphragm, and a value of an ISO.

15. The image sensor module of claim 9, wherein the color transformation circuit is further configured to transform the first and second images from a RGB color space to a color difference space.

16. An image processing device, comprising:
a color transformation circuit configured to generate color difference information based on a first image having a first exposure and a second image having a second exposure, the first exposure being greater than the second exposure, and the color difference information being indicative of first color differences between color channels of the first image and second color differences between color channels of the second image; and
an image fusion circuit configured to generate an output image based on the color difference information and a first green channel of the first image; wherein
the first image includes a first red channel, a first blue channel and the first green channel;
the first color differences include a pixel intensity difference between the first red channel and the first green channel and a pixel intensity difference between the first blue channel and the first green channel;
the second image includes a second red channel, a second blue channel and a second green channel; and
the second color differences include a pixel intensity difference between the second red channel and the second green channel and a pixel intensity difference between the second blue channel and the second green channel.

17. The image processing device of claim 16, wherein the image fusion circuit is further configured to
generate a fused color difference for the first and second images based on the color difference information; and
generate the output image by combining the fused color difference with the first green channel of the first image.

18. The image processing device of claim 17, further comprising:
a color fringe detection circuit configured to generate color fringe detection information based on detected chromatic aberration in the first image;
a weight map formation circuit configured to generate a weight map based on the color fringe detection information and the color difference information; and wherein
the image fusion circuit is further configured to generate the fused color difference based on the color difference information and the generated weight map.

19. The image processing device of claim 16, wherein the first image includes chromatic aberration, and the second image does not include chromatic aberration.

* * * * *